United States Patent [19]

Williams et al.

[11] 4,292,853
[45] Oct. 6, 1981

[54] FLUID FLOW MEASURING APPARATUS

[75] Inventors: Garnet M. E. Williams, London; Stanley P. Hutton, Southampton; John A. Bushman, London, all of England

[73] Assignee: Ferraris Development and Engineering Co., Ltd., London, England

[21] Appl. No.: 142,803

[22] Filed: Apr. 22, 1980

[30] Foreign Application Priority Data

Apr. 23, 1979 [GB] United Kingdom ............... 14015/79

[51] Int. Cl.³ ............................................... G01F 1/06
[52] U.S. Cl. ............................................... 73/861.79
[58] Field of Search ............ 73/861.33, 861.79, 861.81

[56] References Cited

U.S. PATENT DOCUMENTS 3,572,118 3/1971 Hilzendegen ...................... 73/861.79
4,131,017 12/1978 Back ..................................... 73/861.79
4,182,175 1/1980 Boehringer ......................... 73/861.81

FOREIGN PATENT DOCUMENTS 500801 6/1930 Fed. Rep. of Germany ... 73/861.79
2430904 1/1976 Fed. Rep. of Germany ... 73/861.79
44383 8/1908 Switzerland ...................... 73/861.79

Primary Examiner—Herbert Goldstein
Attorney, Agent, or Firm—Edwin E. Greigg

[57] ABSTRACT

A respiratory air or gas flow volume indicating instrument comprises a tubular stator within a casing which forms an annular gallery around the stator. Oblique slots are formed through the stator so that air or gas flow through them forms a spirally swirling flow which drives a rotor. A barrier constrains air or gas flow in one direction round the gallery. The length of each slot is increased progressively in the direction of flow around the stator (20) from a radial port to the barrier. The slots open at one end of the stator and have sloping side and end faces so that the aperture at the radially inner end of each slot is smaller than the aperture at the radially outer end of that slot.

24 Claims, 5 Drawing Figures

FLUID FLOW MEASURING APPARATUS

CROSS REFERENCE TO COPENDING RELATED APPLICATIONS AND RELATED PRIOR ART

WRIGHT Respirator: British Patent Specification Ser. No. 765,206

Stanley P. HUTTON: U.S. Application Ser. No. 36.902, Filed May 7, 1979.

None of the above, whether taken and viewed singly or in combination with each other, are believed to have a bearing on the patentablility of any claim of this invention.

BACKGROUND OF THE INVENTION

This invention relates to apparatus for measuring volume of flow of a fluid comprising a casing; a tubular stator which is housed within the casing so that the casing forms a circumferential gallery around it; inlet and outlet ports formed by the casing so that one of them communicates with the gallery and the other with the bore of the tubular stator; a rotor which is journaled within the casing for rotation within the bore of the stator coaxially therewith; oblique slots which are formed in the tubular wall of the stator so that a path for flow of fluid to be measured between the inlet and the outlet ports is formed by the bore of the stator, the oblique slots being orientated so that fluid directed along said path forms a spirally swirling fluid flow which drives the rotor; and means by which a readout indication of the fluid flow volume is derived from rotation of the rotor. Such apparatus will be identified as "fluid flow measuring apparatus of the kind referred to" from here on.

Use of fluid flow measuring apparatus of the kind referred to to provide an indication of a patient's respiration is governed by the sensitivity of the apparatus and by the pressure drop that is established between the inlet and the fluid flow outlet of the apparatus when the apparatus is used. It has long been recognised that that pressure drop needs to be very low if the apparatus is to be useful for indicating the respiratory performance of very sick people. Apparatus which is sufficiently sensitive to respond to flow rates of the order of 2.5 Liters per minute can be used to indicate the respiratory performance of the majority of patients but a greater sensitivity is necessary for measuring the respiratory performance of young children or very sick adults.

One form of fluid flow measuring apparatus of the kind referred to which has been used widely for many years to provide an indication of a patient's respiration is an instrument which is described and illustrated in British Patent Specification No. 765,206 and which is known as a "Wright Respirometer". The port that communicates with the gallery is formed by a tube which projects radially outwards with respect to the stator and the other port is formed by a tube which is coaxial with the stator. That part of the instrument that comprises the rotor, the tubular stator and the casing that forms the gallery, the inlet and the fluid flow outlet is known as a turbine. This instrument will respond to flow rates as low as 2.5 liters per minute so that it can be used to indicate the respiratory performance of most people but it is insufficiently sensitive for it to be useful to measure the respiratory performance of young children or very sick adults.

The use of disposable turbines in a Wright Respirometer has been precluded up to now because of the degree of precision that has been required to produce the instrument so that it will respond to flow rates as low as 2.5 liters per minute without there being unacceptably high pressure drop across it. Hence each such instrument needs to be sterilized prior to its use with each patient.

SUMMARY AND OBJECTS OF THE INVENTION

One object of this invention is to provide a form of apparatus of the kind referred to which is sufficiently sensitive for it to be suitable for useful use to indicate the respiratory performance of patients who are either so young or so sick that the presently available instrument is insufficiently sensitive to respond to their respiratory flows or so that the use of disposable turbines is a possibility.

According to one aspect of this invention, there is provided fluid flow measuring apparatus of the kind referred to in which said one port projects radially outwardly from the gallery, wherein the effective cross-sectional area of at least one of the slots differs from the effective cross-sectional area of all the other slots.

Preferably the effective cross-sectional area of each slot differs from the effective cross-sectional area of all the other slots.

We prefer to provide means by which all or substantially all the fluid flow to be measured is constrained to flow around the tubular stator in one circumferential direction. The provision of such means forms the subject of the co-pending United States Patent Application Ser. No. 36902 which is assigned to the same assignees as is this application.

In the sense of said one circumferential direction, the effective cross-sectional area of each slot, except the last one, differs from that of the next one by a substantially constant amount. Preferably the effective cross-sectional area of each slot is greater than is that of the next one in said sense. The changes in the effective cross-sectional areas of the slots are preferably arranged so that the kinetic energy of flow through each slot is substantially equal to the kinetic energy of flow through each of the other slots. Such an arrangement of slots which have progressively larger cross-sectional areas in said one circumferential direction is achieved most conveniently by arranging for each of the slots to have a uniform cross-section normal to the axis of the stator and for that uniform cross-section to be substantially the same for all the slots whilst providing each slot, except the last one, with a length as measured parallel to the axis of the stator, which is less than that length of the next one. Preferably each slot has its end remote from said other of the inlet and outlet ports spaced from that prot by substantially the same distance.

We have found that the sensitivity of apparatus of the kind referred to which is provided with means by which all or substantially all the fluid flow to be measured is constrained to flow in said one circumferential direction and which is provided with slots which each have their ends remote from said other of the inlet and outlet ports spaced from that port by substantially the same distance and whose lengths decrease progressively in said one circumferential direction is improved significantly as compared to similar apparatus which differs only in that all its slots have substantially the same cross-sectional area. Furthermore, we have found that where the slots are arranged with their ends remote from said other of the inlet and outlet ports spaced from that port by the same distance and their lengths increase progressively in said one circumferential direction, the apparatus exhibits an even greater improvement in sensitivity. Although these improvements is sensitivity were found to be accompanied by increases in pneumatic resistance it is believed that the degree of increase in pneumatic resistance is tolerable. Also these improvements have been obtained without incurring the disability that different levels of initial flow may be needed to initiate rotation of the rotor from rest depending upon the location of the rotor relative to the slots at which it came to rest, this being a disability which has bedevilled earlier proposals for improving the sensitivity of apparatus of the kind referred to.

The cross-sectional area of the gallery may diminish from the inlet in said one circumferential direction. This may be achieved by arranging for the end of the gallery nearer said other port to slope spirally away from said other port towards a barrier which comprises said fluid flow constraining means.

The casing of a Wright Respirometer forms an annular cavity at the end of the gallery that is nearer said other port and we prefer to provide an annular insert which is located within the annular cavity and which forms an annular end wall of the annular gallery. Preferably that part of the annular insert that is aligned with said one port is shaped so that the radially inner end of said one port is unobstructed by said annular insert. The portion of the annular end wall that is formed by the remainder of the annular insert that extends in said one circumferential direction from said one port to a barrier which comprises said fluid flow constraining means, conveniently comprises a minor sloping portion, which is formed by a chamfer on the insert adjacent said one port and a major substantially flat portion which is aligned substantially with the end of the longest slot that is nearer said other port.

The stator may be a moulding of plastics material.

Each slot of the tubular stator of a Wright Respirometer is substantially parallel to the axis of the tubular stator, extends to the end of the stator and has a curved end face at its other end, the outer end of that curved end face being that part of that curved end face that is furthest from said one end.

According to another aspect of this invention there is provided fluid flow measuring apparatus of the kind referred to above wherein each slot is tapered other than radially outwardly, the angle of taper being small. Each slot may be tapered radially inwardly, the taper being formed in each slot by said flat end wall sloping at a small angle to the axis of the stator so that the aperture at the outer end of that slot is slightly larger than the aperture at the inner end of that slot. Conveniently the small angle is an angle of the order of 2°.

The side faces of each slot may converge radially inwardly.

Where the slots are open at their other ends they may taper towards the respective flat end wall.

This aspect of the invention facilitates production of the stator as a die casting or injection moulding of plastics material without there being a significant increase in pneumatic resistance. BRIEF DESCRIPTION OF THE DRAWINGS One embodiment of this invention will be described now by way of example with reference to the accompanying drawings, of which:

DETAILED DESCRIPTION OF A PREFERRED EMBODIMENT

Figure 1:
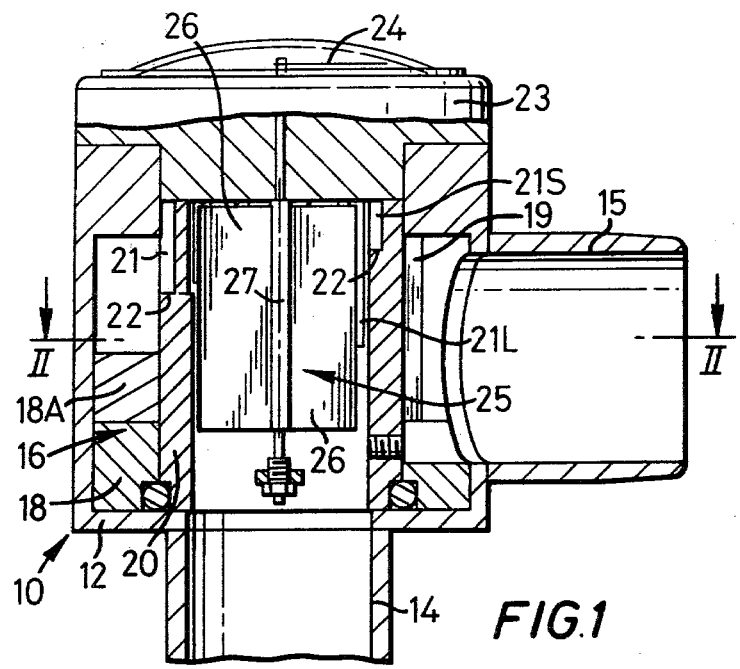
FIG. 1 is a partly sectioned side view of one form of instrument in which this invention is embodied and which is for indicating volume of flow of air or gas for respiration, the instrument being sectioned on the line I—I of FIG. 2.
Figure 2:
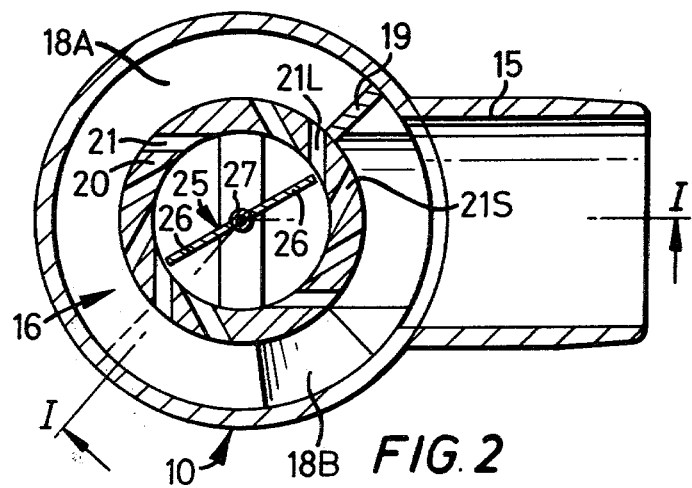
FIG. 2 is a section of the instrument shown in FIG. 1 on the line II—II in FIG. 1.
Figure 3:
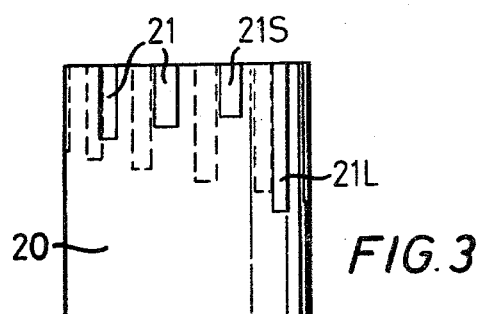
FIG. 3 is a side view of the stator of the instrument shown in FIGS. 1 and 2.

The instrument illustrated in FIGS. 1, 2, 3 and 4 of the drawings comprises a cup-shaped casing 10 which has a slotted tubular stator 20 mounted coaxially in it and abutting its base 12. The casing 10 forms a circumferential gallery around the stator 20, a tubular port 15 which communicates at one end with the gallery and projects radially outwardly from the gallery, and a coaxial tubular port 14 which communicates with the interior of the stator 20 and projects axially from the base 12. The construction of the casing 10 is described in detail in the specification of the above mentioned co-pending United States Patent Application Ser. No. 36902 dated May 7, 1979. The circumferentially extending corner formed within the cavity of the casing 10 between the base 12 and the cylindrical casing wall is lined by a composite ring 16 (See FIG. 4) into which the stator 20 is spigotted. A plate 19 substantially closes the gallery and is adjacent the rear edge of the tubular inlet 15 as considered in the clockwise sense as seen in FIG. 2.

Ten slots 21 are formed in the tubular wall of the stator 20, each slot 21 being spaced circumferentially from the others. Each slot 21 is oblique to the radii and tangents at either of its ends and is orientated so that, when considered in the clockwise direction as seen in FIG. 2, its radially inner end leads its radially outer end. Each slot 21 extends to the end of the tubular stator 20 remote from the base 12 and has a flat end face 22 at its other end. The end face 22 of each slot 21 slopes at a small angle, say an angle of the order of 2° to a plane which is normal to the axis of the tubular stator 20. The sides of each slot 21 are slightly convergent so that they contain a small angle, say an angle of approximately 4° and so that their inner edges are nearer to one another than are their outer edges. Hence the aperture at the radially inner end of each slot 21 is smaller than the aperture at the outer end of that slot. The axial length of each slot differs from that of the remainder. The shortest slot 21 is that one, 21S, that is nearest the plate 19 and that faces the radial port 15. Each slot 21 is shorter by a substantially constant amount than the adjacent one that is displaced from it in the clockwise direction as seen in FIG. 2. Hence the longest slot 21L is that one that is nearest the plate 19 but that is on the opposite side of the plate 19 from the radial port 15. The cross-section of each slot 21 shown in FIG. 2 is typical of the cross-section of that slot which is substantially uniform over the whole of its length and the dimensions of that cross-section are substantially the same for all the slots 21.

Figure 4:
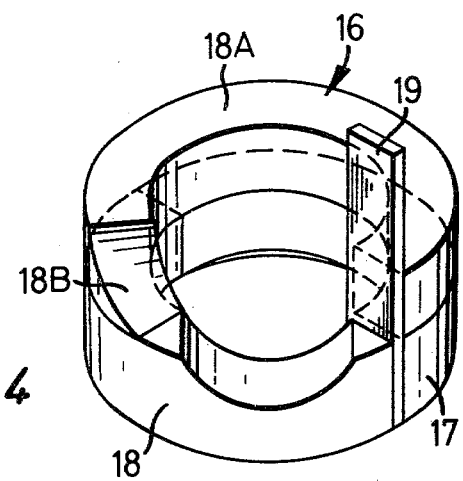
FIG. 4 is an isometric view of a detail of the instrument shown in FIGS. 1 and 2.

FIG. 4 shows that the composite ring 16 comprises two arcuate parts 17 and 18 which abut one another at one end. One end of the plate 19 is sandwiched between the other ends of the arcuate parts 17 and 18. The upper surface of the arcuate part 18 that is aligned with the tubular port 15 is relieved to form an arcuate recess so that the part of the tubular port 15 that is nearest to the base 12 is not obstructed by the arcuate part 18. A rectangular cross-section C-shaped part 18A is laid on the arcuate parts 17 and 18 with one end abutting the plate 19. A 45° chamfer 18B is formed at the other end which is adjacent the end of the arcuate recess in an arcuate part 18 that is remote from the plate 19. The radial thickness of the C-shaped part 18A is substantially equal to that of the parts 17 and 18 and the depth of its non-chamfered major portion is substantially equal to the shortest distance between the bottom of the longest slot 21L and the top of the arcuate part 17.

A gear box 23, which carries a counting gear train (not shown) and an indicator dial (not shown) which is swept by a pointer 24, is fitted to the cup-shaped casing 10 so that that part of the gear box 23 remote from the indicator dial is spigotted into the central aperture formed by the brim of the casing 10 and abuts the end of the tubular stator 20 remote from the base 12.

A rotor 25, comprising a pair of axial vanes 26, is supported coaxially within the tubular stator 20 for rotation about its axis. The rotor spindle 27 projects into gear box 23 and is drivingly coupled to the pointer 24 by the counting gear train. Hence the location of the pointer 24 with respect to the indication dial is an indication of rotation of the rotor 25.

The tubular stator 20 is a moulding of plastics material. Air or gas for respiration enters the annular gallery formed between the cylindrical wall 13 and the tubular stator 20 in use of the instrument through port 15 and circulates around that annular gallery in a clockwise direction as seen in FIG. 2, air or gas flow in the opposite direction being prevented by the barrier 19. The chamfer 18B on the C-shaped part 18A minimises the incidence of turbulence.

Some of the air or gas that flows around the tubular stator 20, in a clockwise direction, as shown in FIG. 2, enters each slot 21, being deviated from the circumferential path by an acute angle. The air or gas that flows into each slot 21 emerges from the radially inner end of each slot 21 so that the air or gas emerging from all the slots 21 forms a spirally swirling gas flow within the bore of the tubular stator 20, the spirally swirling gas flow driving the rotor 25, which in turn drives the pointer 24 through the counting gear train housed in the gear box 23. The air then emerges through pot 14. The position of the pointer 24 relative to the indicator dial indicates volume of flow of air or gas for respiration through the instrument. The gallery and the slots 21 are arranged such that the volume rate of flow through each slot 21 is substantially the same. Hence the kinetic energy of each stream that emerges from the inner end of each slot 21 is substantially the same.

The optimum number of slots 21 formed in the tubular stator 20 is a compromise between the conflicting requirements of sensitivity and pressure drop across the instrument, because both the sensitivity and the pressure drop increases with a reduction in the number of slots. Another factor to be taken into consideration by the designer is that a reduction in the number of slots increases the tendency for there to be a need for different levels of initial flow of air and gas through the instrument to initiate rotation of the rotor depending upon the location of the stationary rotor relative to the slots. If the spacing between adjacent slots is too greate the level of initial air or gas flow necessary to initiate rotation when the stationary rotor is located just past a slot is different from that required to initiate rotation when the stationary rotor is just short of the area of influence of air or gas flow out of the slots.

Figure 5:
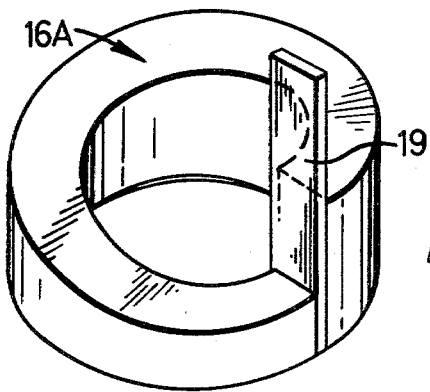
FIG. 5 illustrates a modification of the detail shown in FIG. 4.

FIG. 5 shows an alternative form of composite ring 16A for use in place of the composite ring 16. The surface of the composite ring 16A remote from the base 12 forms a spiral slope so that the distance between it and the end of the stator 20 remote from the base 12 diminishes in the clockwise direction as seen from above in FIG. 2. The arrangement is such that the composite ring 16A does not occlude any part of any of the slots 21, especially the longest one 21L that is adjacent the plate 19 on the opposite side of that plate 19 from the radial plate 15.

Other arrangements of oblique slots which have different effective cross-sectional areas have been considered. We have already mentioned the possible arrangement in which the length of each slot is less than the previous one as the barrier is approached. We have also considered an arrrangement of slots which increase or decrease in length progressively which are closed at both ends and which have their ends nearer the base 12 equi-spaced therefrom. In a further possible arrangement the distance between both ends of each slot and the adjacent end of the stator either increases or decreases progressively. With the latter arrangement it is possible for the geometric centres of all the slots to be in a common plane which is normal to the stator axis. However we prefer the arrangement described above with reference to and illustrated in FIGS. 1 to 4.

The side faces of each slot 21 may taper from the open end to the flat end face which would be normal to the axis of the stator rather than sloping as described above.

We claim:

1. Apparatus for measuring volume of flow of a fluid comprising a casing; a tubular stator which is housed within the casing so that the casing forms a circumferential gallery around it; inlet and outlet ports formed by the casing so that one of them communicates with the gallery and projects radially outwardly therefrom and the other one communicates with the bore of the tubular stator from which it projects axially; a rotor which is journaled within the casing for rotation within the bore of the stator coaxially therewith; oblique slots which are formed in the tubular wall of the stator so that a path for flow of fluid to be measured between the inlet and the outlet is formed by the bore of the tubular stator, the oblique slots and the gallery, the oblique slots being orientated so that fluid directed along said path forms a spirally swirling fluid flow which drives the rotor; and means by which a readout indication of the fluid flow volume is derived from rotation of the rotor; wherein the effective cross-sectional area of one of the slots differs from the effective cross-sectional area of all the other slots.

2. Apparatus according to claim 1, wherein the effective cross-sectional area of each slot differs from the effective cross-sectional area of all the other slots.

3. Apparatus according to claim 2, wherein means are provided by which all the fluid flow to be measured is constrained to flow around the tubular stator in one circumferential direction.

4. Apparatus according to claim 3, wherein, in the sense of said one circumferential direction, the effective cross-sectional area of each slot, except the last one, differs from that of the next one by a substantially constant amount.

5. Apparatus according to claim 3, wherein, in the sense of said one circumferential direction, the effective cross-sectional area of each slot, except the last one, is greater then that of the next one.

6. Apparatus according to claim 5, wherein each of the slots has a substantially uniform cross-section normal to the axis of the tubular stator and the cross-section of each slot is substantially the same, the length of each slot, except the last one in the sense of said one circumferential direction, as measured parallel to the axis of the stator, being less than the length of the next one in said sense.

7. Apparatus according to claim 5, wherein each slot has its end remote from said other of the inlet and outlet ports spaced from that port by substantially the same distance.

8. Apparatus according to claim 7, wherein the end wall of each slot nearer to said other port is substantially flat.

9. Apparatus according to claim 8, in which the casing forms an annular cavity at the end of the gallery that is nearer said other port, wherein an annular insert, which is located within the annular cavity, forms an annular end wall of the annular gallery.

10. Apparatus according to claim 9, wherein that part of the annular insert that is aligned with said one port is shaped so that the radially inner end of said one port is unobstructed by said annular insert.

11. Apparatus according to claim 10, wherein the portion of the annular end wall that is formed by the remainder of the annular insert that extends in said one circumferential direction from said one port to a barrier which comprises said fluid flow constraining means, comprises a minor sloping portion, which is formed by a chamfer on the insert adjacent said one port, and a major substantially flat portion which is aligned substantially with the end of the longest slot that is nearer said other port.

12. Apparatus according to claim 5, wherein the cross-sectional area of the gallery diminishes from said one port in said one circumferential direction.

13. Apparatus according to claim 12, wherein the end of the gallery nearer said other port slopes spirally away from said other port towards a barrier which comprises said fluid flow constraining means.

14. Apparatus according to claim 1, in which an end wall of the slot nearer said other port is flat and in which the slots are open at their other ends and each taper towards the respective flat end wall.

15. Apparatus according to claim 1, wherein the end wall of each slot nearer said other port is flat, and each slot is tapered other than radially outwardly, the angle of taper being small.

16. Apparatus according to claim 15, wherein each slot is tapered radially inwardly, the taper being formed in each slot by said flat end wall sloping at a small angle to the axis of the stator so that the aperture at the outer end of the slot is slightly larger than the aperture at the inner end of the slot.

17. Apparatus according to claim 15, wherein the side faces of each slot converge radially inwardly.

18. Apparatus according to claim 15, in which the slots are open at their other ends and each taper towards the respective flat end wall.

19. Apparatus according to claim 1, wherein each slot is tapered radially inwardly, the taper being formed in each slot by a flat end wall sloping at a small angle to the axis of the stator so that the aperture at an outer end of the slot is slightly larger than the aperture at the inner end of the slot.

20. Appartus according to claim 1, wherein the side faces of each slot converge radially inwardly.

21. Apparatus according to claim 1, in which the slots open each taper towards a flat end wall.

22. Apparatus for measuring volume of flow of a fluid comprising a casing; a tubular stator which is housed within the casing so that the casing forms a circumferential gallery around it; inlet and outlet ports formed by the casing so that one of them communicates with the gallery and the other with the bore of the tubular stator; a rotor which is journaled within the casing for rotation within the bore of the stator coaxially therewith; oblique slots which are formed in the tubular wall of the stator so that a path for flow of fluid to be measured between the inlet and outlet ports is formed by the bore of the stator, the oblique slots and the gallery, the oblique slots being orientated so that fluid directed along said path forms a spirally swirling fluid flow which drives the rotor, the end wall of each slot nearer said other port being flat, wherein each slot is tapered other than radially outwardly, the angle of taper being small; and the slots are open at their other ends and each tapers toward the respective flat end wall.

23. Apparatus according to claim 22, wherein each slot is tapered radially inwardly, the taper being formed in each slot by said flat end wall sloping at a small angle to the axis of the stator so that the aperture at the outer end of the slot is slightly larger than the aperture at the inner end of the slot.

24. Apparatus according to claim 22, wherein the side faces of each slot converge radially inwardly.

* * * * *